United States Patent Office 2,798,289
Patented July 9, 1957

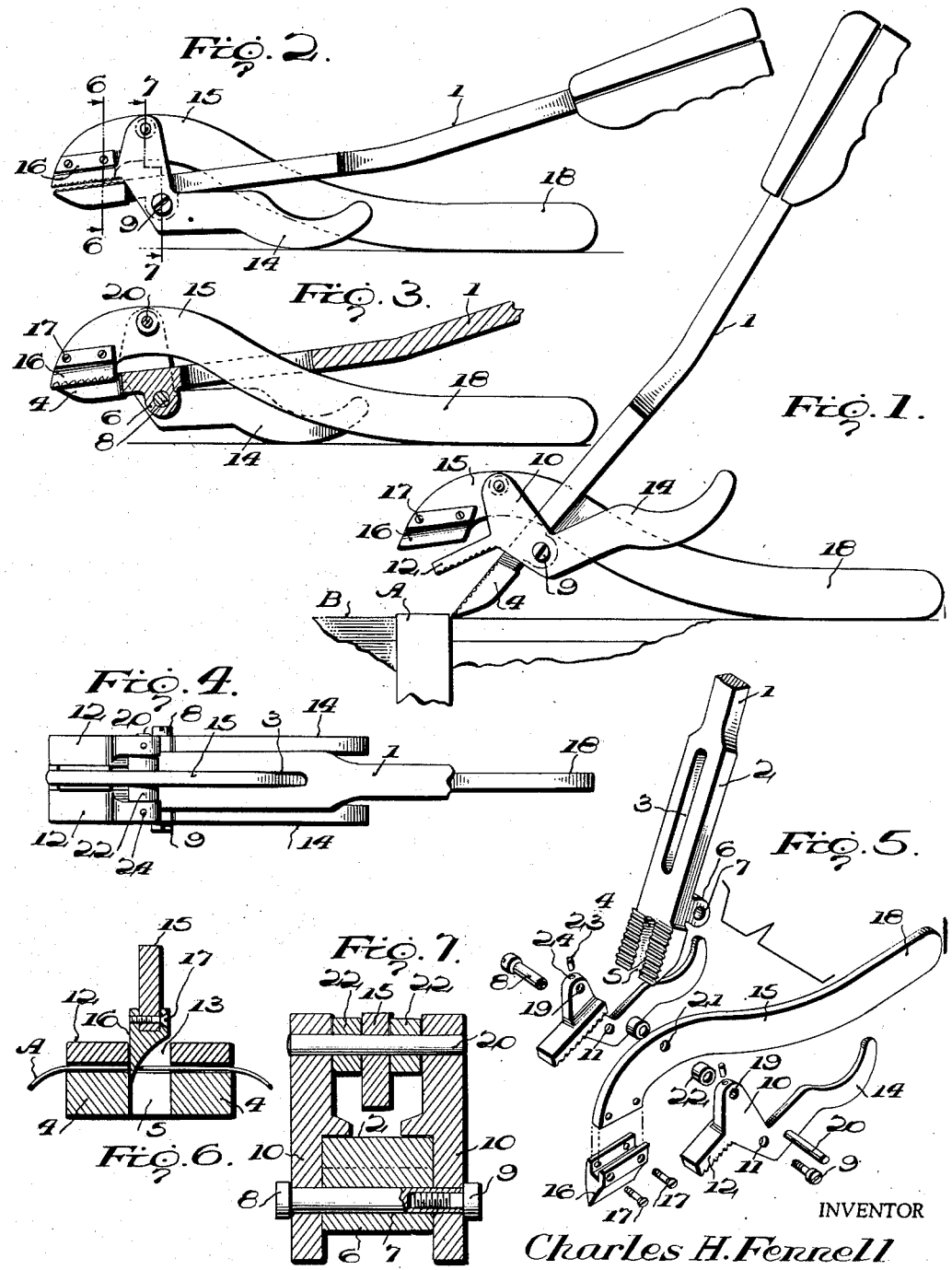

2,798,289
SAFETY CUTTING TOOL FOR STEEL BANDS

Charles H. Fennell, Baltimore County, Md.

Application August 8, 1956, Serial No. 602,945

5 Claims. (Cl. 30—134)

(Granted under Title 35, U. S. Code (1952), sec. 266)

The invention described herein, if patented, may be manufactured and used by or for the Government for governmental purposes, without the payment to me of any royalty thereon.

This invention relates to cutting devices and particularly to a cutting mechanism for cutting the bindings or straps on banded boxes, crates, bales, packages, etc. In the opening of bales of hay and similar packages serious injuries are frequently caused the operator by the flying up of the severed ends of the band or wire which is tightly bound about the material of the package. Consequently a primary object of the present invention resides in combining with the cutter a mechanism for gripping the strap at opposite sides of the cutting point so as to immobilize the severed ends of the band.

Another object of the invention consists in the provision of a cutting tool having the foregoing characteristics and yet which is composed of relatively few parts which may be assembled and placed on the market at low cost.

Other objects and advantages of the invention will be apparent from the following description when taken in connection with the accompanying drawings, in which, Figure 1 is a side elevational view of the novel safety cutting tool showing the same about to be applied to a band of a bale of hay or the like;

Figure 2 is a similar view showing the cutting tool with the gripping jaws slightly spaced apart;

Figure 3 is a side elevational view partly in section showing the cutting tool with the jaws closed and the knife moved to cutting position;

Figure 4 is a plan view of the cutting tool with part of the operating handle broken away;

Figure 5 is an exploded perspective view showing the various details of the tool;

Figure 6 is an enlarged transverse sectional view taken on line 6—6 of Figure 2; and, Figure 7 is a similar view taken on line 7—7 of Figure 2.

Referring to the drawings in greater detail and by reference numeral and especially Figures 1 and 2, the numeral 1 indicates the handle of the tool to the forward end of which is integrally connected a flattened portion 2 provided with an elongated central slot 3 and formed at its inner end with a serrated lower jaw 4 provided with a slot 5 to permit the entrance of the knife blade as will hereinafter appear. On the lower side of the flattened portion 2 is a boss 6 apertured as at 7 for the reception of a pintle 8 and its fastening bolt 9.

Pivotally connected at each side of the operating handle 1 by means of the pintle 8 just referred to are links 10. These links are provided with apertures 11 adjacent their lower ends and receive the pintle 8 so as to pivotally connect the links to the handle 1. Each of these links 10 is provided with a forwardly extending and serrated upper jaw 12 which is laterally spaced as indicated by numeral 13 (Figure 6) so as to provide a passageway for the cutting blade of the knife to be later described. Integrally formed on each of the links 10 and extending rearwardly thereof is an extension or handle portion 14 which is adapted to engage the body of the bale or package when the cutting tool is placed in operative cutting position.

The knife for cutting the metallic band of a package is indicated generally by the numeral 15 provided with a detachable cutting blade 16 at its forward end as by machine screws 17 and having a rearward extension 18 adapted to engage the body of the package when the cutting tool is placed in operative position. This knife 15 extends through the longitudinal slot 3 in the operating arm 1 and is pivotally connected to the upper ends of the links 10. To this end each of the links is provided with an aperture 19 adjacent its upper end for the reception of a hinge pintle 20 and the knife 15 is provided with an aperture 21 for the same purpose. Spacer sleeves 22 serve to centrally locate the knife with respect to the links 10 and the hinge pintle is firmly secured in position by setscrews 23 which may be threaded through apertures 24 in the upper ends of the links so as to secure the pintle 20 in position.

In the operation of the device the lower laterally spaced integral jaws 4, which are tapered at their forward ends, are slid under the metallic band A of a package B, the initiation of which is indicated in Figure 1 of the present drawings. Thereafter it is only necessary that the operator press downwardly on the operating arm or handle 1 thereby causing, through the medium of the links 10 and rearward extensions 14, a closing action of the jaws 4 and 12 into gripping engagement with the band or wire A. Further downward movement of the operating handle 1 toward the bale or package causes, by reason of the rearward extension 18 on the knife 15, the downward passage of the knife blade 16 into the passageway 13 between the laterally spaced upper jaws 12 so as to sever the band A as the blade continues its movement into the space 5 between the lower gripping jaws 4. Thus the severed ends of the band are tightly gripped by the jaws 4 and 12 so as to prevent them from flying apart and causing damage upon completion of the severing action just mentioned.

From the foregoing description taken in connection with the accompanying drawings, it will be apparent to those skilled in the art that I have provided a relatively simple construction of safety cutting tool for metallic bands composed essentially of three elements, namely the upper and lower gripping jaws and the knife 15—16; and that by reason of the rearward extensions 14 and 18 associated with the upper jaws 12 and the knife 15—16, the device may be readily operated by one hand inasmuch as it is only necessary to force the lower jaw 4 under the band to be severed and thereafter press the operating handle 1 toward the bale or package being operated upon.

In accordance with the patent statutes I have described what I now believe to be the preferred form of the invention but since various minor structural details may be modified without departing from the spirit of the invention, it is intended that all such modifications be included within the scope of the appended claims.

I claim:

1. A safety cutting tool for metal bound packages adapted to operate in a plane normal to the package, comprising a lower gripping jaw, an elongated handle rigidly connected therewith, a pair of laterally-spaced upper gripping jaws pivotally connected with the lower jaw, laterally-spaced extensions on said upper jaws adapted to engage a surface of the package when the cutter is in operation, a knife pivotally associated with said jaws and adapted to pass between said laterally-spaced jaws, and a rearward extension on said knife adapted to engage the package and move the blade to cutting position as the handle is operated to cause the upper and lower jaws to grip the metal binding.

2. A safety cutting tool for metal bound packages adapted to operate in a plane normal to the package, comprising a relatively wide lower gripping jaw, an elongated integral handle extending rearwardly therefrom, a pair of laterally-spaced upper gripping jaws pivotally connected with the lower jaw, laterally-spaced extensions on said upper jaws adapted to engage a surface of the package when the cutter is in operation, a knife pivotally associated with said jaws and adapted to extend between the laterally-spaced upper jaws, and a rearward extension on said knife adapted to engage the package and move the blade to cutting position as the handle is operated to cause the upper and lower jaws to grip the metal binding.

3. A safety cutting tool for metal bound packages adapted to operate in a plane normal to the package, comprising a lower gripping jaw, an operating handle extending rearwardly therefrom, a knife, a link having one end pivotally connected to the lower jaw, a pivotal connection between the opposite end of the link and the knife, an upper gripping jaw rigidly connected with an intermediate portion of the link, and rearward extensions on the lower end of the link and on the knife adapted to engage a surface of the package when the lower jaw is passed under the metal band and the operating handle is pressed toward the package.

4. A safety cutting tool for metal bound packages adapted to operate in a plane normal to the package, comprising a lower gripping jaw, an operating handle extending rearwardly therefrom, a knife, a pair of links each having one end pivotally connected to the lower jaw, a pivotal connection between the opposite ends of the link and the knife; laterally spaced upper gripping jaws rigidly connected with intermediate portions of the links and providing a passageway for the blade of the knife, and rearward extensions on the lower end of the links and on the knife adapted to engage a surface of the package when the lower jaw is passed under the metal band and the operating handle is pressed toward the package.

5. A safety cutting tool for metal bound packages adapted to operate in a plane normal to the package, comprising upper and lower gripping jaws and a knife, a link pivotally connecting each of said elements, and rearward extensions on the lower jaw, knife and link, the extension on the lower jaw constituting an operating handle, whereby the insertion of the lower jaw under a metal band and the movement of the operating handle toward the package will cause the jaws to grip the band and the knife to sever the same.

References Cited in the file of this patent
UNITED STATES PATENTS

| | | |
|---|---|---|
| 572,644 | Lemm | Dec. 8, 1896 |
| 579,093 | Kelly | Mar. 16, 1897 |
| 1,493,539 | Hess | May 13, 1924 |